US012173526B2

(12) United States Patent
Fäßler et al.

(10) Patent No.: US 12,173,526 B2
(45) Date of Patent: Dec. 24, 2024

(54) APPARATUS FOR PARKING OBJECTS WITH A HORIZONTALLY ORIENTED DRIVE

(71) Applicants: Klaus Multiparking GmbH, Aitrach (DE); Norbert Faßler, Haslach (DE); Dieter Melder, Türkheim (DE)

(72) Inventors: Norbert Fäßler, Haslach (DE); Dieter Melder, Türkheim (DE)

(73) Assignee: Klaus Multiparking GmbH, Aitrach (DE)

( * ) Notice: Subject to any disclaimer, the term of this patent is extended or adjusted under 35 U.S.C. 154(b) by 510 days.

(21) Appl. No.: 17/609,533

(22) PCT Filed: Mar. 13, 2020

(86) PCT No.: PCT/EP2020/057000
§ 371 (c)(1),
(2) Date: Nov. 8, 2021

(87) PCT Pub. No.: WO2020/224837
PCT Pub. Date: Nov. 12, 2020

(65) Prior Publication Data

US 2022/0213710 A1 Jul. 7, 2022

(30) Foreign Application Priority Data

May 8, 2019 (DE) ..................... 20 2019 102 585.9

(51) Int. Cl.
*E04H 6/06* (2006.01)
*B66F 7/04* (2006.01)
(Continued)

(52) U.S. Cl.
CPC ................. *E04H 6/06* (2013.01); *B66F 7/04* (2013.01); *B66F 7/28* (2013.01); *B66F 2700/12* (2013.01); *E04H 6/188* (2013.01)

(58) Field of Classification Search
CPC ... E04H 6/06; E04H 6/188; B66F 7/02; B66F 7/04
See application file for complete search history.

(56) References Cited

U.S. PATENT DOCUMENTS 4,178,094 A * 12/1979 Silverberg ........... G03G 15/755 399/165
4,674,938 A * 6/1987 Van Stokes ............... B66F 7/04 187/253
(Continued)

FOREIGN PATENT DOCUMENTS

DE 7536753 U 3/1976
DE 4028484 A1 3/1992
(Continued)

OTHER PUBLICATIONS

German Search Report for German Application No. 20 2019 102 585.9 dated Apr. 22, 2020 (8 pages).
International Search Report for International Application No. PCT/EP2020/057000 dated Jun. 8, 2020 (16 pages).

*Primary Examiner* — Mark C Hageman
(74) *Attorney, Agent, or Firm* — REISING ETHINGTON, P.C.

(57) ABSTRACT

An apparatus for parking objects, in particular vehicles, is provided. The apparatus includes at least one platform which can be moved by a movement device and which has a parking surface, at least one drive which is part of the movement device, and at least one traction means which is part of the movement device. The traction means connects an anchor point to the movement drive. The drive is configured as a linear drive which includes a stationary base part and a connecting element which is linearly movable with respect thereto. The movement direction of the connecting element is substantially horizontal.

44 Claims, 7 Drawing Sheets

(51) Int. Cl.
*B66F 7/28* (2006.01)
*E04H 6/18* (2006.01)

(56) References Cited

U.S. PATENT DOCUMENTS

| | | | | |
|---|---|---|---|---|
| 5,020,382 | A | 6/1991 | Lutz | |
| 5,031,727 | A | 7/1991 | Clare | |
| 5,176,225 | A | 1/1993 | Nussbaum | |
| 6,446,757 | B1 * | 9/2002 | Taylor | B66F 7/04 187/361 |
| 8,297,410 | B2 * | 10/2012 | McDonald | E04H 5/06 187/253 |
| 11,512,490 | B2 * | 11/2022 | Fäßler | B66F 7/02 |
| 2009/0166131 | A1 * | 7/2009 | McDonald | E04H 5/06 187/251 |
| 2010/0089845 | A1 | 4/2010 | Fässler et al. | |

FOREIGN PATENT DOCUMENTS

| | | | | |
|---|---|---|---|---|
| DE | 29519425 | U1 | 2/1996 | |
| EP | 0381484 | A1 | 8/1990 | |
| EP | 0881343 | A1 * | 12/1998 | E04H 6/06 |
| EP | 1473269 | A1 | 11/2004 | |
| GB | 1102586 | A | 2/1968 | |
| GB | 2268467 | A | 1/1994 | |
| WO | WO2006128241 | A1 | 12/2006 | |

* cited by examiner

Fig. 7
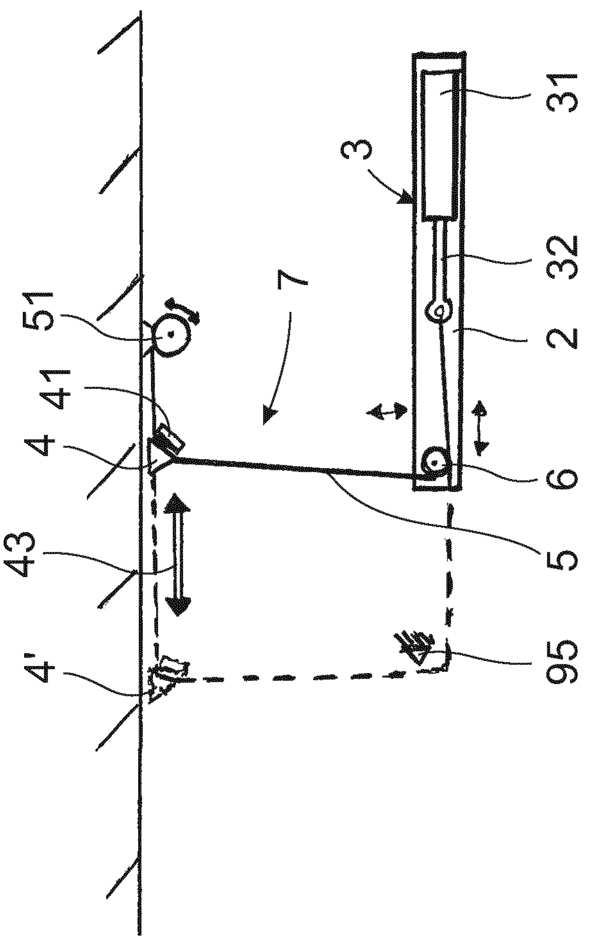
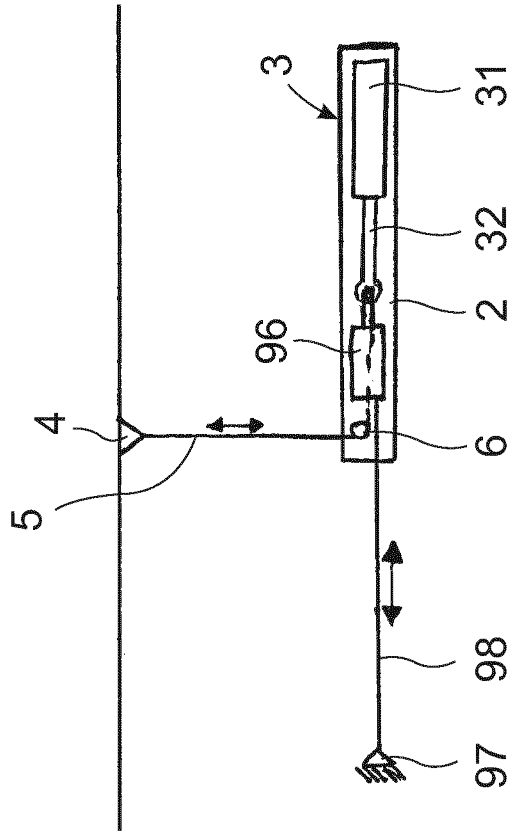
Fig. 8

APPARATUS FOR PARKING OBJECTS WITH A HORIZONTALLY ORIENTED DRIVE

INTRODUCTION

The disclosure relates to an apparatus for parking objects, in particular vehicles, having at least one platform which can be moved by means of a movement device and which has a parking surface, at least one drive which is part of the movement device and at least one traction means which is part of the movement device.

There are various embodiments of apparatuses for parking objects, in particular for parking vehicles one above the other. These apparatuses serve to make optimum use of limited storage space which is available. To this end, a plurality of objects are stored one above the other. In order to reach objects which are stored above other objects, at least a portion of such an apparatus has to be moved. Generally, a drive is used for this movement. Such a drive must be able to move the objects which are stored further above in a reliable manner and at the same time afford good accessibility for examination and maintenance operations.

From the prior art, apparatuses for parking objects are known in which a drive for moving objects which are stored further above is arranged on the ground inside the apparatus or beside the apparatus. This arrangement has the advantage that the drive is readily accessible. The disadvantage of this prior art is that the drive itself requires space which is lost for the storage of objects. With an arrangement of a drive beside the apparatus, additional structural space which is often also not available is required.

SUMMARY

An object, per an embodiment of the disclosure is to provide solutions for parking objects which enable better use of the structural space available.

This object is achieved, per an embodiment, with an apparatus for parking objects, in particular vehicles, at least comprising

- at least one platform which can be moved by means of a movement device and which has a parking surface,
- at least one drive which is part of the movement device,
- at least one traction means which is part of the movement device, wherein the traction means connects an anchor location to the drive, wherein the movement drive is configured as a linear drive which comprises a fixed base portion and a connection element which can be moved in a linear manner relative thereto, wherein the movement direction of the connection element is substantially horizontal.

An apparatus according to an embodiment comprises at least one platform which is provided to receive and at least temporarily store objects. This platform has a parking surface on which the objects to be stored are parked. Generally, this parking surface is constructed in a planar manner. Furthermore, an apparatus according to an embodiment comprises a movement device which is provided to move the platform. In this instance, the movement device may be configured in such a manner that only a vertical movement of the platform is enabled. However, it is also often necessary to also move a platform in a horizontal direction. Consequently, the movement device may also be configured in such a manner that it enables a movement of the platform in a horizontal direction. Finally, the movement device may also be configured in such a manner that both vertical and horizontal movements of the platform are enabled, even when they overlap. In this case, the movement device comprises at least one drive which actively ensures the movement of the platform. Generally, such a drive is configured as an operating cylinder which has a drive element which moves in a linear direction and which is referred to below as a connection element. Furthermore, the movement device comprises according to an embodiment at least one traction means. This traction means is suitable for transmitting traction forces. One embodiment of such a traction means is a chain. Alternatively, however, the traction means may also be configured as a cable. A chain or a cable constitutes traction means which are configured in a pliable and flexible manner. Generally, traction means which are configured in a rigid manner, such as, for example, drawbars, are also suitable for an apparatus according to an embodiment. The traction means of an apparatus according to an embodiment connects the drive to an anchor location. This anchor location may in this instance be arranged on a movable portion of the apparatus. Alternatively, the anchor location may also be fitted at a permanently idle, stationary location. Such an idle location could, for example, be on a framework or frame of the apparatus or on a building portion which belongs to the apparatus. According to an embodiment, the drive is configured as a linear drive which has a base portion and a connection element which can be moved in a linear manner relative thereto. When the linear drive is configured as a hydraulic cylinder, the cylinder with the pressure connections forms the base portion and the piston rod forms the linearly movable connection element. In this instance, it is not absolutely necessary for the base portion to be idle during operation of the apparatus and for only the connection element to move. It is also possible during operation of the apparatus for the base portion and the connection element to move in a vertical and/or horizontal direction. Furthermore, the connection element can be securely anchored to an apparatus portion and the base portion can move in a more linear manner and relative to the connection element. Generally, however, the base portion is securely fixed to an apparatus portion and the connection element moves relative to the base portion during operation of the apparatus. According to an embodiment, there is provision for the movement direction of the connection element, or alternatively the movement direction of the base portion, to be substantially horizontal. This horizontal movement direction relates to the operating state of the apparatus. A horizontal movement direction of the connection element requires a horizontal orientation of the drive which is configured as a linear drive. This horizontal orientation of the drive brings about a series of surprising advantages per certain embodiments: the platform generally has a large length and width in comparison with its height. A horizontally orientated drive can consequently be arranged in a space-saving manner in a horizontal direction on or parallel with the platform. With an arrangement on the platform, no structural space is required for the drive below the platform. Consequently, there is considerably more structural space or storage space available below the platform than with known apparatuses from the prior art. With an arrangement of the drive parallel with the platform, the drive may, for example, be secured with the base portion thereof above the platform. Also in this embodiment, no structural space is required below the platform for the drive so that more storage space is available in this instance. As a result of a horizontal arrangement of the drive, the storage space provided below the platform is thus optimized and the structural space required by the apparatus itself is reduced. Furthermore, a substantially horizontal movement direction of the connection element brings about a simplification of the movement device. For the movement of the platform, the drive cooperates with the traction means and the anchor location. In this instance, the movement of the connection element of the drive is transmitted by means of a suitable mechanism to the traction means. The movement of the traction means is then transmitted via either the anchor location or another element to the platform. In a first, lowered position of the platform, a portion of the traction means extends in a vertical direction. This portion of the traction means which extends in a vertical direction is in the first lowered position longer than the vertically extending portion of the traction means in a second, raised position of the platform. There is consequently a length difference in the vertically extending portion of the traction means between the first, lowered position and the second raised position of the platform. The length of the traction means which corresponds to this length difference must be stored or kept in a raised position of the platform. With a horizontal movement direction of the connection element, this length difference of the traction means can be very simply kept in a horizontal direction parallel with the platform without additional components. As a result of the horizontal arrangement of the drive and consequently of the connection element, components which would be required with a non-horizontal orientation of the drive for temporary storage of the traction means are consequently saved. As a result of the horizontal arrangement of the drive, components are consequently saved in the apparatus and it is thereby simplified.

Furthermore, in an embodiment, there is provision for the movement device to move the platform in a horizontal and/or vertical direction. As described above, the movement device and/or the drive may be configured in such a manner that a movement of the platform in a horizontal and/or vertical direction or in both directions in an overlapping manner relative to each other is enabled. With apparatuses for parking objects, both movement directions are increasingly required in order to achieve a high packing density of objects in the storage volume available.

In an embodiment of the proposal, there is provision for the anchor location to be configured so as to be able to be changed in terms of its horizontal position relative to the movement device or to be arranged in a fixed manner. In a horizontally fixed embodiment of the anchor location, it is provided in cooperation with the traction means to form a purely vertical movement of the platform. Alternatively, the anchor location may also be configured to be able to be moved horizontally relative to the movement direction, in particular relative to the drive. A change of the horizontal position of the anchor location is thereby possible. Before activating the movement device, a change of the horizontal position of the anchor location can consequently be carried out. As a result of a change of this horizontal position, the traction means also used for changing the vertical position of the platform can then be used at the same time to change the horizontal position of the platform.

Furthermore, there is provision for the drive to be able to be optionally connected to a horizontal gear mechanism, wherein the horizontal gear mechanism converts a movement produced by the drive into a horizontal movement of the platform. In this embodiment, the traction means serves exclusively to move the platform in a vertical direction. Should the platform in contrast be moved in a horizontal direction, a horizontal gear mechanism which can optionally be connected to the drive is provided. Prior to a horizontal movement of the platform, the drive is connected to this horizontal gear mechanism. The horizontal gear mechanism then converts the movement of the drive into a horizontal movement of the platform. If the desired horizontal position of the platform is reached, the horizontal gear mechanism is separated from the drive again. Advantageously, per an embodiment, the connection between the traction means and the drive is also optionally configured. The traction means can consequently be separated from the drive in a simple manner. In an embodiment, either the drive is connected to the horizontal gear mechanism for horizontal movement of the platform or the drive is connected to the traction means for vertical movement of the platform. A single drive which is orientated in a horizontal manner can consequently be used both for vertical movement of the platform and for horizontal movement of the platform. Since a drive in most cases constitutes a costly component, this embodiment provides a cost-effective apparatus which has only one drive and which enables a movement of the platform in two spatial axes.

In an embodiment, there is provision for the apparatus to comprise at least one redirection means for redirecting the traction means, wherein the traction means connects the anchor location to the drive via the redirection means which changes the direction of the traction means. In this embodiment, a redirection means is provided between the drive and anchor location. This redirection means is operationally connected to the traction means. The traction means extends in this instance around the redirection means. This changes the direction of the traction means when it extends around the redirection means. The portion of the traction means which extends from the drive to the redirection means consequently extends in a different direction from the portion of the traction means which extends from the redirection means to the anchor location. The redirection means may, for example, be configured as a rotatably supported redirection roller, via which the traction means is guided. The redirection means is provided to convert a horizontal movement which is transmitted by the drive to the traction means into a movement which extends in another direction. Generally, the redirection means changes the horizontal direction of the traction means which extends from the drive to the redirection means into a vertical direction. As a result of such a redirection, the horizontal movement of the connection element of the drive is converted in a simple manner into a vertical movement of the platform. Other embodiments of the redirection means will be described below.

Advantageously, per an embodiment, there is provision for the drive to be connected to the platform at the base portion thereof and for the drive to move together with the platform in a vertical direction. In this embodiment, the drive is securely connected to the platform which can be moved in a vertical direction. During a movement of the platform in an upward and downward direction, the drive consequently moves together with the platform. In this embodiment, a redirection means which is connected to the platform and which also moves together therewith in a vertical direction is also provided. In this embodiment, the anchor location is not arranged on the platform but instead at a location of the apparatus which remains stationary or at a location of the building which surrounds the apparatus, which location remains stationary. In this embodiment, the drive is arranged in a particularly space-saving manner on or below the moving platform. Below the platform, consequently, no structural space is required for the drive or for other elements of the movement device.

In another embodiment, there is provision for the movement device to have at least one vertically extending guide which has a fixed portion which is secured to a fixed base, in particular a building or a frame, and the guide further has a movable portion which is connected to the platform and the movable portion is guided so as to be able to be moved vertically in the fixed portion. In this embodiment, the movement device includes a vertically extending guide for the platform during its movement in a vertical direction. A movable portion of this guide is securely connected to the platform. This movable portion of the guide engages in a fixed portion of the guide which is arranged in a fixed manner. When the platform is moved, the movable portion moves along the fixed portion of the guide. As a result of such a guide, a precise, vertical movement of the platform is ensured.

Furthermore, there is provision for at least one side portion to be provided on the platform adjacent to the parking surface and for the drive to be secured to the side portion. In this embodiment, the platform has at least one side portion. This side portion delimits a longitudinal or transverse side of the platform. Generally, the side portion is arranged at right-angles with respect to the parking surface. As a result of the drive being secured to the side portion, no space or structural space is also required for the drive on the platform or the parking surface. Such an arrangement of the drive on a side portion of the platform consequently brings about a particularly efficient use of the structural space available and a particularly large volume which can be used for storing objects inside the apparatus.

Advantageously, per an embodiment, there is provision for the drive to be secured below the platform, in particular below the parking surface. In this embodiment, the drive is arranged below the platform. As a result of this arrangement, there is no space lost on the parking surface for arrangement of the drive so that in this alternative embodiment there is a particularly good use of space for storing objects in the apparatus.

Furthermore, in the proposal, there is provision for the drive to be configured as a hydraulic cylinder, as a pneumatic cylinder, as an electromechanical linear drive or as an electric linear motor. The drive can be formed by means of various actuators with a linear movement direction. Depending on the infrastructure available, hydraulic types or pneumatic types may constitute advantageous embodiments for the drive. Alternatively, electromechanical drives may be provided, in which for example, a rotating electric motor engages in a toothed rack via a pinion and thus produces a linear movement of the toothed rack. Generally, all embodiments of a linear drive are also disclosed.

In an embodiment of the proposal, there is provision for a plurality of movement devices and/or drives to be provided. In this embodiment, more than one movement device and/or more than one drive are provided. A redundant provision of these elements increases the reliability during operation of the apparatus. As a result of the provision of a plurality of such elements, the static and dynamic requirements placed on these elements are reduced so that more cost-effective variants can be used.

There is further provision for the anchor location to be arranged in a fixed manner above the platform and to be identical to or connected to a location on a building or a fixed frame. In this embodiment, the anchor location is configured in a non-movable and stationary manner. The anchor location thus remains idle when the platform is moved. The anchor location is arranged above the platform. The traction means extends at least partially from the platform in a vertical direction to the anchor location. Such a fixed anchor location may, for example, be arranged on a frame or framework of the apparatus or relative to a building portion which belongs to the apparatus. This embodiment is particularly suitable for apparatuses in which the drive moves together with the platform in a vertical direction. Advantageously, per an embodiment, there is arranged between the drive and the fixed anchor location a redirection means which also moves together with the platform and which changes the direction of the traction means.

In an embodiment, there is provision for the anchor location to be arranged on the platform and so as to be non-movable relative to the platform. In this alternative embodiment, the anchor location moves together with the platform. To this end, the anchor location is securely connected to the platform and cannot be moved relative thereto. This embodiment is particularly suitable in combination with a drive which is arranged in a fixed manner outside the platform. Advantageously, per an embodiment, there is additionally provided a redirection means which is also arranged in a fixed manner outside the platform.

Advantageously, per an embodiment, there is provision for the redirection means to be configured as a roller which is rotatably supported with respect to the platform and to be arranged on the platform. A rotatably supported roller is particularly advantageous, per an embodiment, for redirecting the traction means since, as a result of a rotatably supported roller, hardly any friction losses occur during redirection. This embodiment, in which the redirection means is connected to the platform, is particularly advantageous in combination with a fixed anchor location and a movably arranged drive.

In another embodiment, there is provision for the redirection means to be configured as a roller which is rotatably supported relative to a fixed base, in particular a building or a frame, and to be arranged on the fixed base. In this embodiment, a redirection means which is configured as a rotatable roller is arranged in a fixed, that is to say, non-movable manner. This embodiment is particularly suitable in combination with an anchor location which is arranged on the platform and a drive which is fitted in a fixed manner.

Furthermore, in an embodiment there is provision for the redirection means to be configured as a fixed sliding piece which is arranged on the platform or a fixed base, in particular a building or a frame. In this embodiment, the redirection means for the traction means is configured in a particularly simple and cost-effective manner. In place of a rotatably supported roller, a non-movable, rigid sliding piece, via which the traction means is guided, is used. This sliding piece has in this instance at least one smooth surface, via which the traction means is guided. During operation of the apparatus, sliding friction is produced between the traction means and the sliding piece but is small as a result of the smooth surface. An advantage of a redirection means which is configured as a sliding piece is, on the one hand, the simple capacity for production and, on the other hand, the lack of movable components which increases the maintenance-friendliness. A redirection means which is configured as a sliding piece, in a similar manner to the embodiment set out above in which the redirection means is configured as a rotatably supported roller, can be arranged alternatively in a fixed manner or on the platform.

Advantageously, per an embodiment, there is provision for the movement direction of the connection element to be directed in the direction toward the redirection means when moved out of the base portion. The traction means is connected to the connection element. In this embodiment, the drive is arranged in such a manner that, when the connection element is moved out of the base portion of the drive, the connection element moves in the direction from which the traction means is moved toward the drive.

Furthermore, in the proposal there is provision for the movement direction of the connection element to be directed in the direction away from the redirection means when moved out of the base portion. In this embodiment, the movement direction of the connection element is the reverse of the embodiment described above. The movement direction of the connection element from the base portion extends in this instance in the opposite direction to the direction from which the traction means is moved toward the drive.

In an embodiment of the proposal, there is provision for the traction means to extend substantially vertically between the redirection means and the anchor location. In this embodiment, the orientation of the traction means between the redirection means and the anchor location enables a particularly efficient movement of the platforms in a vertical direction since the traction means extends parallel with the movement direction of the platform. As a result of a vertical orientation of this region of the traction means, very little structural space is required for the arrangement thereof in the apparatus.

There is further provision for the traction means to extend substantially horizontally between the redirection means and the drive. This embodiment complements the embodiment described above. The traction means extends initially in a horizontal direction from the connection element to the redirection means. After the redirection by the redirection means, the traction means then extends further in a vertical direction from the redirection means to the anchor location. The vertically extending portion of the traction means may in this instance extend from the redirection means either in an upward or in a downward direction.

In an embodiment, there is provision for the drive to be secured to a fixed base, in particular a building or a frame. In this embodiment, the drive is arranged in a non-movable manner outside the platform. The base portion of the drive is in this embodiment arranged in a fixed manner so as to be non-movable. In this embodiment, a redirection means which is also secured to a fixed base is provided. The anchor location in contrast is arranged on the platform and moves together therewith in a vertical and/or horizontal direction.

Advantageously, per an embodiment, there is provision for the traction means to be directly connected to the connection element of the drive and for the connection element to transmit its movement to the traction means. In this embodiment, the traction means is secured directly to the connection element of the drive. For example, a traction means which is configured as a chain can be secured directly to a connection element which is configured as a piston rod. The term “directly” is intended to be understood to mean in this instance that no additional structural elements or components are arranged between the connection element and the traction means.

In another embodiment, there is provision for the traction means to be connected at the end thereof opposite the anchor location to a traction location which is located in a constant position with respect to the base portion and for the traction means to extend from the traction location to the connection element. In this embodiment, the traction means is not connected directly to the connection element. Instead, the second end of the traction means opposite the anchor location is securely connected to a traction location. From this traction location, the traction means then extends initially to the connection element of the drive and from there further to the redirection means and/or the anchor location. The traction means is in this instance consequently indirectly connected to the drive. As a result of the fact that the traction location is arranged in a constant position with respect to the base portion of the drive, with this embodiment a force amplification of the drive in the manner of a pulley can be achieved. Drives with a lower power rating can thereby be used for the apparatus. In this embodiment, the base portion of the drive and traction location can either be movably arranged on the platform or in a fixed manner outside the platform.

Furthermore, there is provision for there to be provided on the connection element a redirection roller via which the traction means is guided. This embodiment is based on the embodiment described above, in which a traction location which is arranged in a constant position with respect to the base portion is provided. A redirection roller is provided on the connection element, for example, on the tip of a connection element which is configured as a piston rod.

The traction means is guided from the traction location via this redirection roller and extends from there further toward the redirection means and/or anchor location. As a result of this redirection roller, a force amplifier in accordance with the principle of a pulley can be achieved in a particularly simple and functionally stable manner.

Advantageously, per an embodiment, there is provision for the apparatus to comprise at least two platforms which can be raised and lowered and which are arranged vertically one above the other, wherein the two platforms are connected with a constant spacing with respect to each other by means of spacer elements. It is also possible to arrange a plurality of platforms for parking objects, in particular vehicles, one above the other. In this instance, the different platforms are connected to each other by means of spacer elements. These spacer elements may be configured in a rigid manner, that is to say, for example, as metal profiles, or in a flexible manner, for example, as steel cables. In an apparatus with a plurality of platforms, however, there are not necessarily also provided several drives, it is sufficient to provide one drive which cooperates as described above with a traction means and an anchor location. As a result of the drive, a platform is directly driven, the other platform(s) is/are coupled in terms of their movement to the driven platform via the spacer elements and consequently move synchronously with the driven platform.

In the proposal, there is further provision for there to be provided laterally on the platform a respective synchronization traction element which extends with a first portion in a first region of the platform over a central second portion which extends on the platform to a third portion to the second region of the platform opposite the first region and which is fixed with one end thereof in the first region and with the other end thereof in the second region, wherein each synchronization traction element is guided at least by a roller on the platform. In this embodiment, synchronization traction elements are provided on the platform and enable a uniform raising and lowering of the platform. The platform has a first region which faces away from the side from which objects are moved onto the platform. A second region of the platform is at the location from which objects are moved onto the platform. With an apparatus for parking vehicles, the vehicles are moved over the second region of the platform onto the platform. The first and second regions of the platform are consequently located at different ends of the platform. During operation of the apparatus, the first region and the second region of the platform are intended to move in a uniform manner. In order to ensure this, synchronization traction elements are fitted laterally to each side of the platform. These synchronization traction elements extend from the first region of the platform to the second region of the platform. The synchronization traction elements are configured in a flexible manner and formed, for example, by means of chains or cables. The two ends of the synchronization traction elements are fixed. This means that the ends are secured in a stationary manner to non-movable portions of the apparatus or the building which surrounds the apparatus. A first end of a synchronization traction element extends with a first portion from the fixing in the first region of the platform to a roller which is movably arranged on the platform. The synchronization traction element is redirected by this roller and extends from this roller in a second portion along the platform to a second roller which is movably arranged relative to the platform. From this second roller, the synchronization traction element extends in a third portion whose other end is fixed. Generally, the first and the third portions of the synchronization traction elements extend in a vertical direction and the central, second portion of the synchronization traction elements extend horizontally, parallel with the platform. The synchronization traction elements are not directly connected to the drive or the traction means. The synchronization traction elements form passive components which during the movement of the platform, as a result of the drive and the traction means, synchronize this movement along the platform and ensure that the first region and the second region of the platform are raised and lowered synchronously. Generally, two synchronization traction elements which are arranged along the longitudinal sides of the platform are provided.

In an embodiment of the proposal, there is provision for the two ends of the synchronization traction elements to be secured to a fixed base, in particular a building or a frame. The two ends of the synchronization traction elements are fixed in a non-movable and stationary manner. This fixing can be carried out on a frame or on a building portion which belongs to the apparatus.

There is further provision for the rollers of both synchronization traction elements to be connected in a rotational manner by means of a synchronization shaft. The synchronization traction elements described above ensure a synchronous vertical movement between a first region which is arranged at the front in the longitudinal direction of the platform and a second region which is arranged at the rear in the longitudinal direction of the platform. The longitudinal direction is intended in this instance to be understood to be the direction of the platform in which the longer side of the platform extends. In order to improve a synchronous, vertical movement in the transverse direction, that is to say, at right-angles to the longitudinal direction, a synchronization shaft which extends in the transverse direction from one side of the platform to the other is provided in this embodiment. This synchronization shaft is arranged between rollers of the synchronization traction elements which are opposite each other in the transverse direction of the platform and securely connected to these rollers. The rotation of a roller is transmitted by the synchronization shaft into a rotation of the other roller. In this embodiment, there is a cooperation between the synchronization traction elements and the rollers. Cooperation is intended to be understood to mean that forces and torques are transmitted between the synchronization traction elements and the rollers. This may, for example, be achieved by the synchronization traction elements being configured as a chain and the rollers as pinions. The pinions engage in this instance in the chain, whereby a movement of the chain, that is to say, of the synchronization traction element, is transmitted to the pinions, that is to say, the rollers. The rotation transmitted by the synchronization shaft from one roller to the other roller is consequently also transmitted via this cooperation between the roller and synchronization traction elements to the second synchronization traction element. As a result of this mechanical coupling, a synchronous raising and lowering of the platform in the transverse direction is achieved. A synchronization shaft is constructed in a simple and robust manner and additionally improves the operational reliability of the apparatus since a tilting of the platform during raising and lowering is thereby effectively prevented. Particularly in embodiments which have both the synchronization traction elements and a synchronization shaft, a uniform vertical movement of the platform is also ensured when only one drive is provided. This embodiment is constructed in a simple and robust manner and has only a single drive. Consequently, this embodiment can also be produced in a particularly cost-effective manner and is easy to assemble.

In an embodiment, there is provision for the synchronization shaft, when viewed from the side of the apparatus, to be arranged vertically in a line with the redirection means. In this embodiment, the apparatus has a redirection means which is arranged vertically above or below the synchronization shaft. The synchronization shaft and the redirection means are located in this instance in a vertical direction in a line. The redirection means represents the location at which the force produced by the drive and traction means is introduced into the platform. Consequently, the drive force acts on the redirection means when the platform is moved in a vertical direction. As a result of the fact that the synchronization shaft is arranged above or below the redirection means, the synchronization shaft and consequently also the rollers of the synchronization traction elements are located in the active line of the force which raises and lowers the platform in a vertical direction. This arrangement is particularly advantageous, per an embodiment, since no torques between the redirection means and the rollers of the synchronization traction elements can thus occur. This arrangement of the synchronization shaft and rollers is consequently not susceptible to distortions of the platform caused by torques and is consequently particularly operationally reliable.

An embodiment of the disclosure is formed by an apparatus for parking objects, in particular vehicles, at least comprising:

at least one platform which can be raised and lowered by means of a movement device and which has a parking surface, at least one drive which is part of the movement device, at least one traction means which is part of the movement device, and at least one redirection means for redirecting the traction means, wherein the traction means, via the redirection means which changes the direction of the traction means, connects an anchor location to the drive, wherein the drive is configured as a linear drive which comprises a fixed base portion and a connection element which can be moved in a linear manner relative thereto, wherein the movement direction of the connection element is substantially horizontal, wherein the drive is connected at the base portion thereof to the platform and the drive moves together with the platform in a vertical direction and the redirection means is configured as a roller which is rotatably supported with respect to the platform and is arranged on the platform and the anchor location is arranged in a fixed manner above the platform and is identical to or is connected to a location on a building or a fixed frame.

This embodiment constitutes a combination of embodiments which were described above in detail. In this embodiment, a redirection means which is arranged on the platform is provided and moves together with the platform. The drive is also connected to the platform with the base portion thereof and consequently also moves together with the platform. The anchor location in contrast is arranged in a fixed, that is to say, non-movable manner above the platform. In this embodiment, the components which are responsible for the movement of the platform are all arranged on the platform. Consequently, for these components, no structural space at all is required below or beside the platform. At the same time, these components are easy to assemble and readily accessible for carrying out maintenance operations. The connection of the traction means to the connection element of the drive may in this instance be carried out directly. Alternatively, the traction means may be secured to a traction location which can be moved with the platform and from there may extend to the connection element, whereby a force amplification in the manner of a pulley is achieved.

An embodiment of the disclosure is formed by an apparatus for parking objects, in particular vehicles, at least comprising

- at least one platform which can be raised and lowered by means of a movement device and which has a parking surface,
- at least one drive which is part of the movement device,
- at least one traction means which is part of the movement device,
- and at least one redirection means for redirecting the traction means, wherein the traction means, via the redirection means which changes the direction of the traction means, connects an anchor location to the drive, wherein the drive is configured as a linear drive, which comprises a fixed base portion and a connection element which can be moved in a linear manner relative thereto, wherein the movement direction of the connection element is substantially horizontal, wherein the drive is secured to a fixed base, in particular a building or a frame, and the redirection means is configured as a roller which is rotatably supported with respect to a fixed base, in particular a building or a frame, and is arranged on the fixed base and the anchor location is arranged on the platform and in a non-movable manner relative to the platform.

This embodiment also constitutes a combination of above-described embodiments. In the alternative embodiment, there is provided a redirection means which is not arranged in the manner of the base portion of the drive on the movable platform, but instead outside at a stationary location. In this embodiment, the drive consequently does not move together with the platform. The anchor location in contrast is arranged on the platform and moves together therewith. This embodiment has the advantage that the platform is configured in a particularly lightweight and simple manner. The drive and redirection means may be arranged in a space-saving manner above the apparatus, for example, on the ceiling of a building component which belongs to the apparatus. In this embodiment, consequently, a particularly small amount of structural space is required for the drive of the platform. For maintenance operations, the drive and the redirection means can also be easily reached via the platform which is moved upward in a vertical direction. In this embodiment, the traction means can also either be connected directly to the connection element of the drive or indirectly connected to the connection element of the drive starting from a traction location. In the embodiment, the traction location to which the end of the traction means opposite the anchor location is secured is also arranged in a stationary manner outside the platform. The traction location may, for example, be arranged on the ceiling of a building portion which belongs to the device, adjacent to the base portion of the drive.

The two embodiments described above can naturally be combined with features from other embodiments previously described.

BRIEF DESCRIPTION OF THE FIGURES

In the drawings, the disclosure is schematically illustrated in particular in embodiments. In the drawings:

FIG. 7 is a schematic side view of a seventh embodiment of an apparatus, FIG. 8 is a schematic side view of an eighth embodiment of an apparatus.

DETAILED DESCRIPTION

Figure 1:
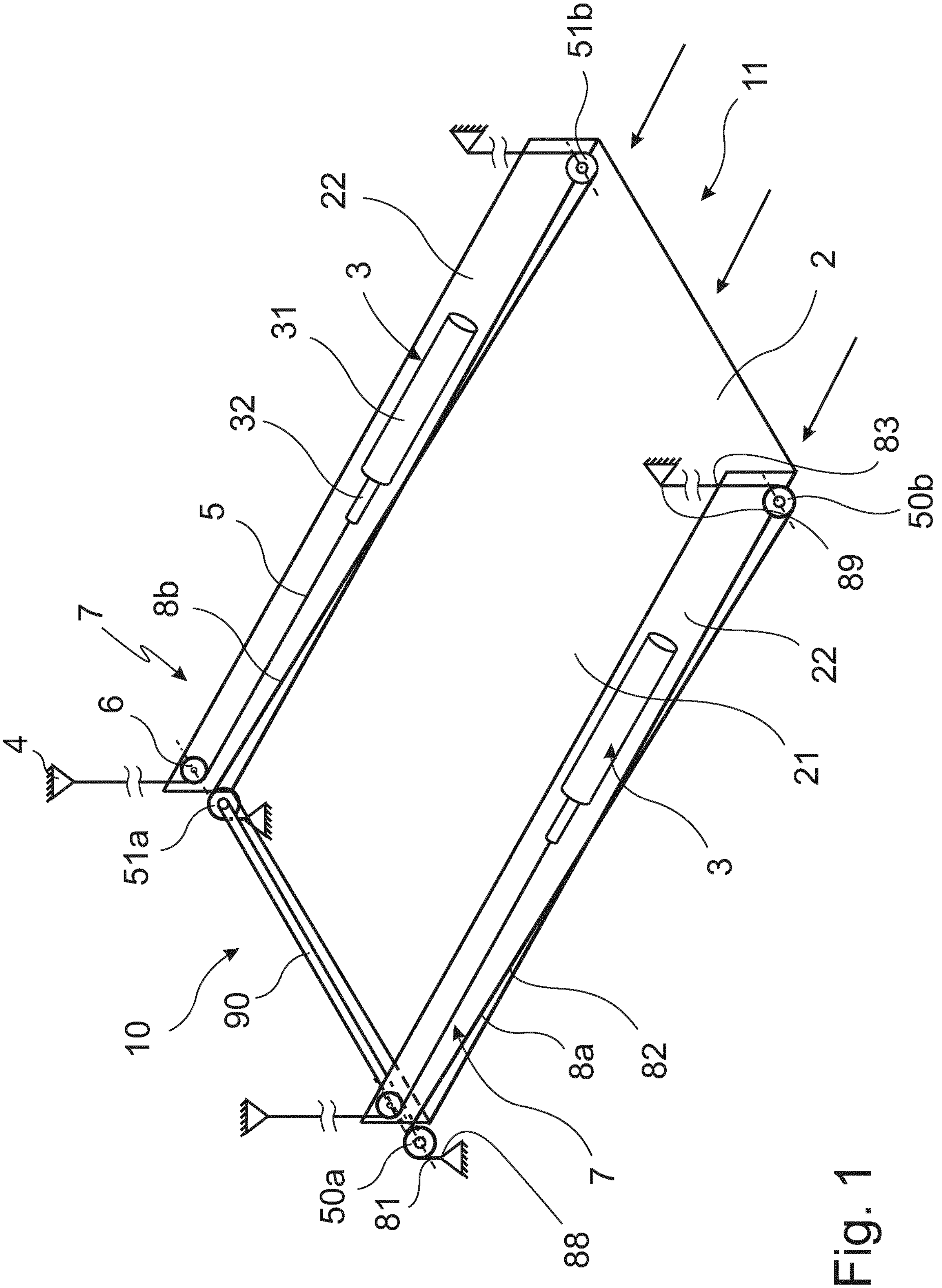
FIG. 1 is a schematic, perspective view of a first embodiment of an apparatus.

In the Figures, elements which are identical or correspond to each other are given the same reference numerals and are therefore not described again unless advantageous. The disclosures contained in the entire description can be accordingly transferred to identical components with the same reference numerals or same component names. The position indications selected in the description, such as, for example, top, bottom, lateral, etcetera, are also in relation to the Figure which has been directly described and illustrated and are accordingly intended to be transferred to the new position in the event of a position change. Furthermore, individual features or feature combinations from the various embodiments shown and described may also constitute solutions which are independent per se, inventive or according to the invention.

FIG. 1 is a schematic, perspective view of a first embodiment of an apparatus. The illustration of all the Figures is schematic. This means that only elements of the apparatus which are significant for the function are shown. The apparatus comprises a platform 2 which can be moved in a vertical direction and which in this instance has a rectangular shape. The apparatus and the platform 2 are provided for parking objects, in particular motor vehicles. In order to park objects on the platform 2, it has a parking surface 21 which is configured in a planar manner in this instance. The platform 2 has a first region 10 which faces toward the back left in the illustration. A second region 11 of the platform is arranged opposite the first region 10 and facing the front right. Objects, in particular vehicles, are moved over the second region 11 onto the platform 11, as indicated by arrows. The first region 10 is generally arranged adjacent to a vertically extending wall so that over the first region 10 normally no objects are moved onto the platform 2 or away from the platform 2. A side portion 22 of the platform 2 is arranged in each case at two longitudinal sides adjacent to the parking surface 21. A longitudinal side is intended in this instance to be understood to be the longer dimension of the platform 2 which extends from the front right to the back left in the illustration. The side portions 22 extend in this instance at right-angles to the parking surface 21. The side portions 22 are configured to be planar per se. The parking surface 21 and the side portions 22 are advantageously constructed from flat metal, in particular from metal profiles which are sufficiently strong to absorb the weight of the objects which are parked. In the embodiment illustrated, the apparatus has two drives 3 which each comprise a securing portion 31 and a connection element 32. The securing portions 31 are securely connected to the side portions 22 of the platform 2. When the platform 2 is moved, the drives 3 consequently move together with the platform 2. At the end of the side portions 22 facing the rear in the first region 10 of the platform, a redirection means 6 in the form of a rotatably supported roller is arranged in each case. The redirection means 6 consequently also move together with the platform 2. Above the redirection means 6, an anchor location 4 which is arranged in a fixed manner can be seen in each case. These anchor locations 4 are arranged outside the platform 2 and consequently do not move together with the platform 2. The anchor locations 4 may, for example, be arranged on the ceiling of a building portion which surrounds the apparatus or which belongs to the apparatus, or on a non-movable carrier frame which belongs to the apparatus. At each side of the platform 2, there is arranged a traction means 5 which is secured in each case to an anchor location 4. The traction means 5 extends from the anchor location 4 initially vertically upward and is then redirected by the redirection means 6 in the horizontal direction. From the redirection means 6, the traction means 5 extends to the connection element 32 of the drive 3. The traction means 5 is in this instance directly connected to the end of the connection element 32 facing away from the base portion 31. The movement device 7 comprises the drive 3 and the traction means 5. A synchronization traction element 8*a*, 8*b* is arranged in each case so as to extend in the longitudinal direction of the platform 2. These synchronization traction elements 8*a*, 8*b* are in each case connected by means of two rollers 50*a*, 50*b* or 51*a*, 51*b* to the side portions of the platform 2. The rollers 50*a*, 50*b*, 51*a*, 51*b* are in this case rotatably secured to the platform 2. The synchronization traction element 8*a* facing the front left will be described below. This description applies similarly to the second synchronization traction element 8*b* which faces the back right. The synchronization traction element 8*a* is secured with an end 88 in a fixed manner to a non-movable location below the platform 2. From this location, a first portion 81 extends in a vertical direction as far, in the first region 10, as the roller 50*a* by means of which the synchronization traction element 8*a* is redirected in a substantially horizontally extending direction. From the roller 50*a*, a second, central portion 82 extends up to the roller 50*b* which is arranged in the second region 11 of the platform 2. The roller 50*b* then redirects the synchronization traction element 8*a* in the vertical direction again. From the roller 50*b*, a third portion 83 extends upward in a vertical direction to a location which is arranged in a fixed manner above the platform. The other end 89 of the synchronization traction element 8*a* is secured to this location. The synchronization traction elements 8*a*, 8*b* may, for example, be configured as chains or cables and additionally serve to ensure that the first region 10 and the second region 11 of the platform 2 move in a uniform manner or synchronously during raising and lowering.

In the first region 10 of the platform 2, the rollers 50*a* and 51*a* in the embodiment illustrated are connected by means of a synchronization shaft 90. The two rollers 50*a* and 51*a* are in this instance arranged in a rotationally secure manner on the synchronization shaft 90. The synchronization shaft 90 serves to ensure a uniform raising and lowering in the transverse direction of the platform 2. To this end, the two rollers 50*a* and 51*a* are operationally connected to the synchronization traction elements 8*a* and 8*b*. In this instance, there is a frictional or positive-locking connection, whereby, when the synchronization traction elements 8*a* and 8*b* move past the rollers 50*a* and 50*b*, they are forced into a rotational movement. Such an operational connection may, for example, be produced by the synchronization traction elements 8*a* and 8*b* being configured as chains and the two rollers 50*a* and 50*b* being configured as pinions which engage in these chains. When the first synchronization traction element 8*a* moves relative to the roller 50*a*, it is caused to carry out a rotational movement and this rotational movement is transmitted to the roller 51*a*. From the roller 51*a*, the rotational movement is in turn converted into a linear movement of the other synchronization traction element 8*b*. The same naturally applies in the reverse direction, that is to say, from the synchronization traction element 8*b* to the synchronization traction element 8*a*. In the case illustrated, the redirection means 6 and the synchronization shaft 90 are not arranged in a vertical direction directly below one another. However, a particularly low-distortion construction is produced by the synchronization shaft 90 and consequently the two rollers 50*a* and 50*b* being arranged in a vertical active line together with the redirection means 6. The embodiment illustrated with two movement devices 7 and a movement which is synchronized by means of a synchronization shaft 90 can be produced in a particularly reliable and cost-effective manner. Such an apparatus has a redundancy of two drives 3 so that the apparatus, in spite of the failure of a drive 3, is fully operational as before. A uniform lifting and lowering of the platform 2 is ensured in a reliable manner in a longitudinal direction by means of synchronization traction elements 8*a* and 8*b* and in the transverse direction by the synchronization shaft 90. As a result of the horizontal arrangement of the drives 33 on the side portions 22, very little structural space is required for the drives 7 and the movement devices 7 so that such an apparatus makes optimum use of the space available for parking objects, in particular vehicles.

Figure 2:
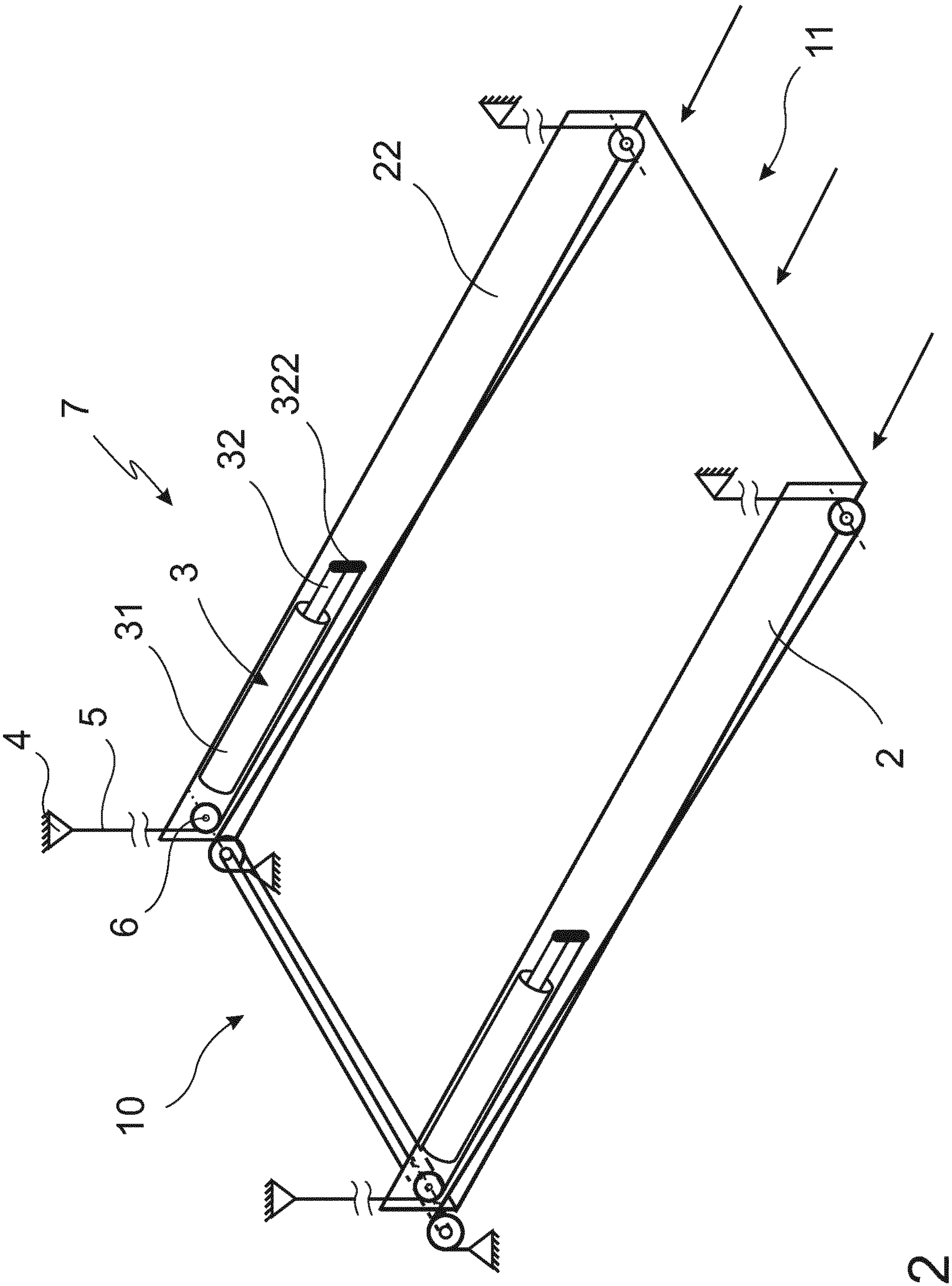
FIG. 2 is a schematic, perspective view of a second embodiment of an apparatus.

FIG. 2 is a schematic, perspective view of a second embodiment of an apparatus. The embodiment illustrated in FIG. 2 differs from the embodiment illustrated in FIG. 1 as a result of the arrangement of the drive 3. With the exception of this arrangement, the embodiment illustrated in FIG. 2 is identical to the embodiment illustrated in FIG. 1. For reasons of clarity, the identical components are only partially provided with reference numerals. For these identical components, reference may be made to FIG. 1 and the associated description. In the embodiment illustrated in FIG. 2, the base portion 31 of the drive 3 is also securely connected to a side portion 22 of the platform 2. Consequently, the drive 3 also moves together with the platform 2 in this instance. The drive 3 is orientated in such a manner that the connection element 32 faces away from the redirection means 6. When the connection element 32 is moved out of the base portion, this movement is consequently also directed away from the redirection means 6. In the embodiment illustrated in FIG. 1, the drive 3 is arranged in a transposed manner so that the connection element 32 moves toward the redirection means 6 when moved out of the base portion. In the embodiment illustrated in FIG. 2, the traction means 5 is connected to the connection element 32 by means of a communication piece. This communication piece 322 is required in this instance in order to guide the traction means 5 past the base portion 31. In the embodiment illustrated in FIG. 2, the entire movement device 7 is arranged in the first region 10 of the platform 2. This arrangement is more compact than in the embodiment illustrated in FIG. 1.

Figure 3:
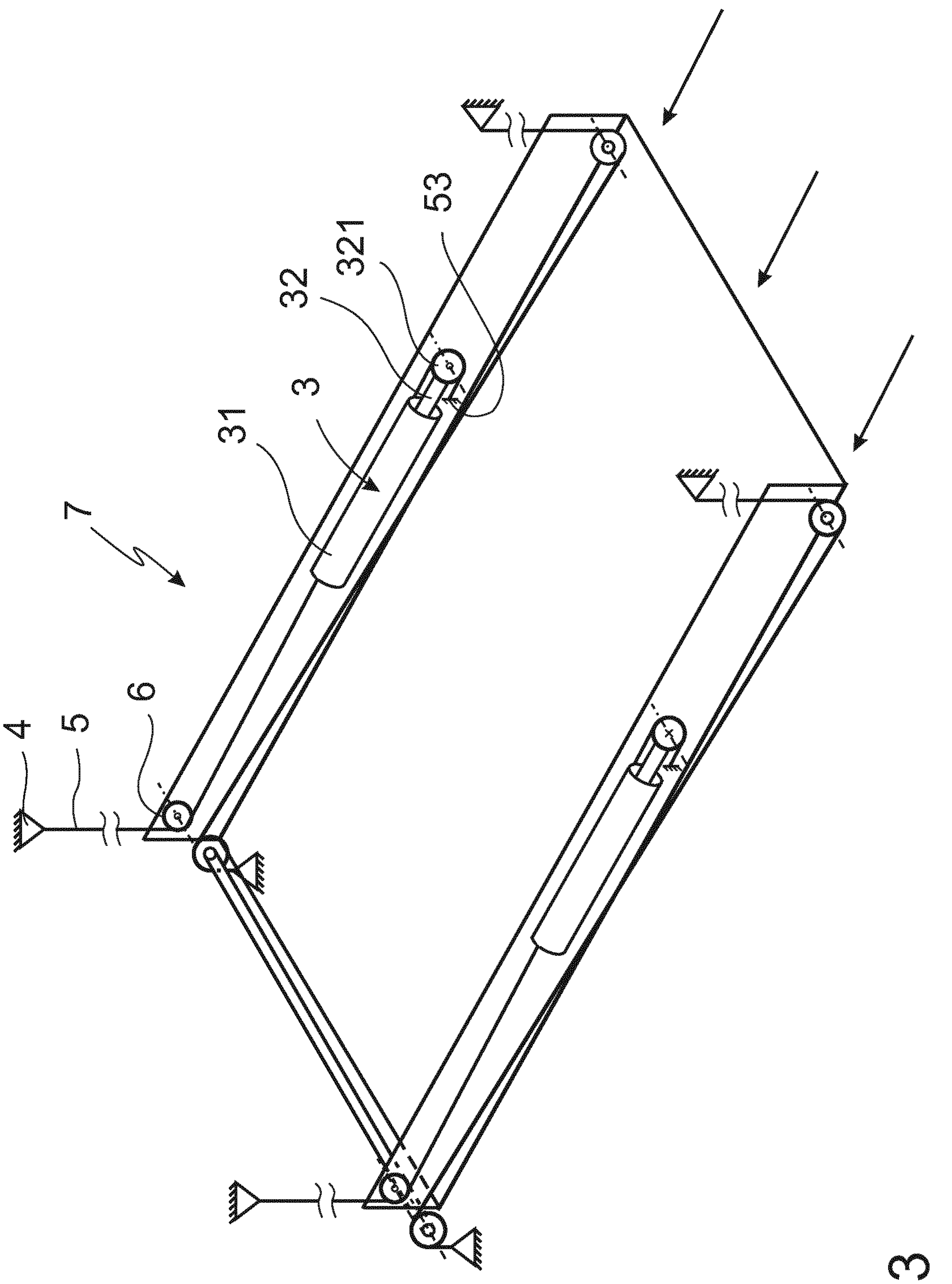
FIG. 3 is a schematic, perspective view of a third embodiment of an apparatus.

FIG. 3 is a schematic, perspective view of a third embodiment of an apparatus. The embodiment illustrated in FIG. 3 differs from the embodiment illustrated in FIG. 1 as a result of the arrangement or positioning of the drive 3 and as a result of the connection of the traction means 5 to the connection element 32. The other portions and elements of the apparatus in the embodiment illustrated in FIG. 3 are identical to the embodiment illustrated in FIG. 1. For these portions and elements, reference may consequently be made to the description of FIG. 1. In the embodiment illustrated in FIG. 3, the drive 3 is arranged in such a manner that the direction faces away from the redirection means 6 when the connection element 32 is moved out of the base portion 31. The end of the traction means 5 facing away from the anchor location 4 is connected in FIG. 3 to a traction location 53 which is fixedly arranged on the side portion 22 of the platform 2. From this traction location 53, the traction means 5 first extends to a redirection roller 321 which is rotatably fitted to the tip of the connection element 32. The traction means 5 is guided around the redirection roller 321 and subsequently extends further in a substantially horizontal direction to the redirection means 6. In this embodiment, the force or movement of the connection element 32 is transmitted indirectly, that is to say, via the redirection roller 321, to the traction means 5. The traction location 53 serves in this instance to introduce force into the platform 2 and is arranged in a non-movable manner with respect to the base portion 31. As a result of this arrangement, the force of the drive 3 is amplified in the manner of a pulley.

Figure 4:
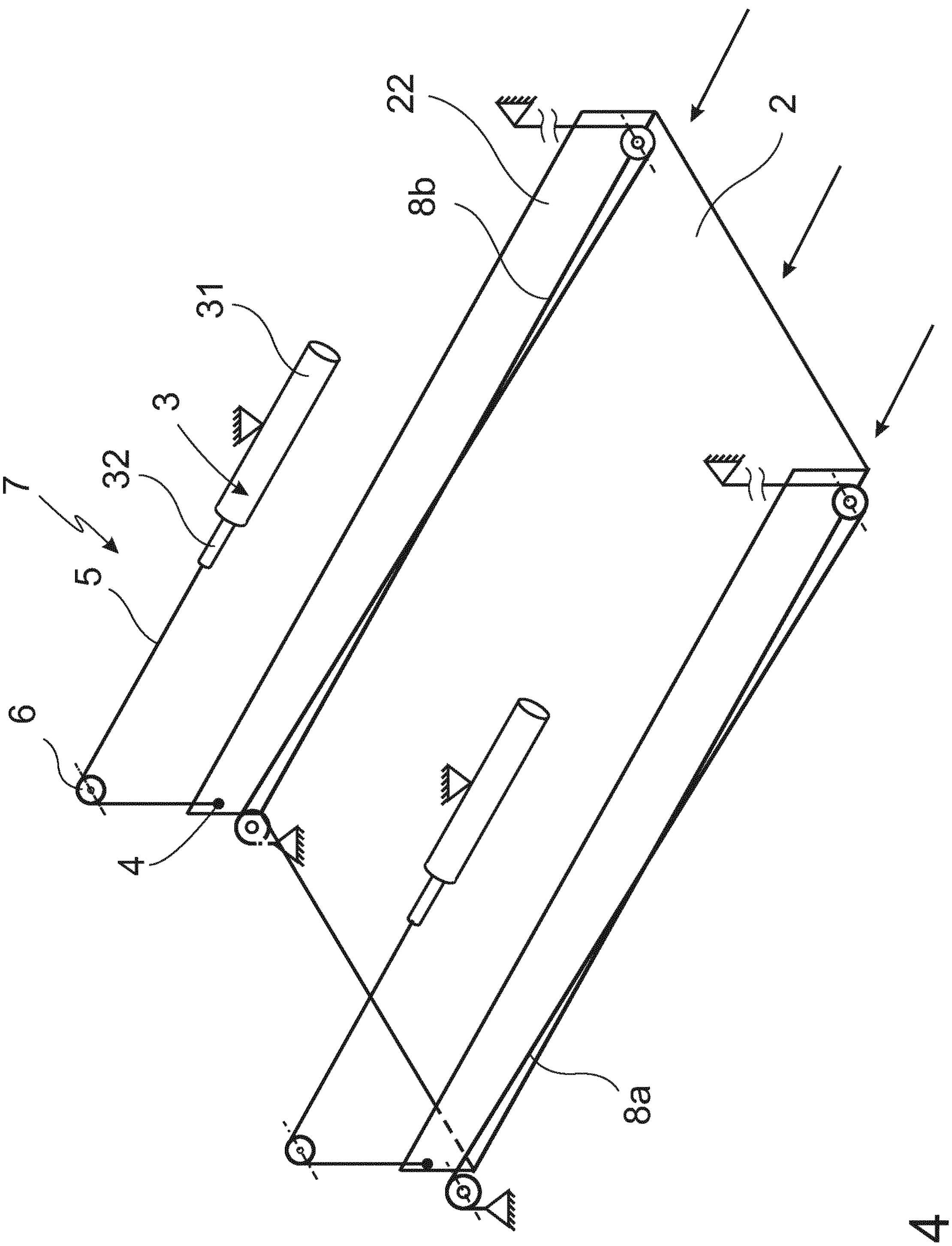
FIG. 4 is a schematic, perspective view of a fourth embodiment of an apparatus.

FIG. 4 is a schematic, perspective view of a fourth embodiment of an apparatus. In this fourth embodiment, in contrast to the embodiments of the drive 3 illustrated in FIGS. 1 to 3, the drive 3 is not arranged on the platform 2, but instead fitted in a fixed manner outside the platform 2. The drive 3 in the embodiment illustrated in FIG. 4 consequently does not move together with the platform 2. In contrast, the anchor location 4 is in the embodiment illustrated arranged on the platform 2 on the side portion 22 thereof and moves together with the platform 2. The traction means 5 begins at this anchor location 4 and extends from there initially vertically upward to a redirection means 6 which is arranged in a fixed manner outside the platform. The traction means 5 is redirected by the redirection means 6 into a horizontal direction. The drive 3 is in this instance orientated in such a manner that the movement direction of the connection element 32 is directed toward the redirection means 6 when moving out of the base portion 31. The traction means 5 is connected directly to the end of the connection element 32 facing away from the base portion 31. In this embodiment, the drive 3 and redirection means 6 are arranged in a particularly space-saving manner above, for example, on the ceiling of the building portion which belongs to the apparatus. In this embodiment, the platform 2 is constructed and can be produced in a particularly simple manner. The embodiment illustrated in FIG. 4 has no synchronization shaft 90 in contrast to the embodiments in FIGS. 1 to FIG. 3. Of course, however, such a synchronization shaft 90 may also be provided in the embodiment illustrated in FIG. 4. The two synchronization traction elements 8*a* and 8*b* are in the embodiment illustrated in FIG. 4 constructed in a similar manner to the embodiment illustrated in FIG. 1. For the synchronization traction elements 8*a* and 8*b*, reference may consequently be made to the description relating to FIG. 1.

Figure 5:
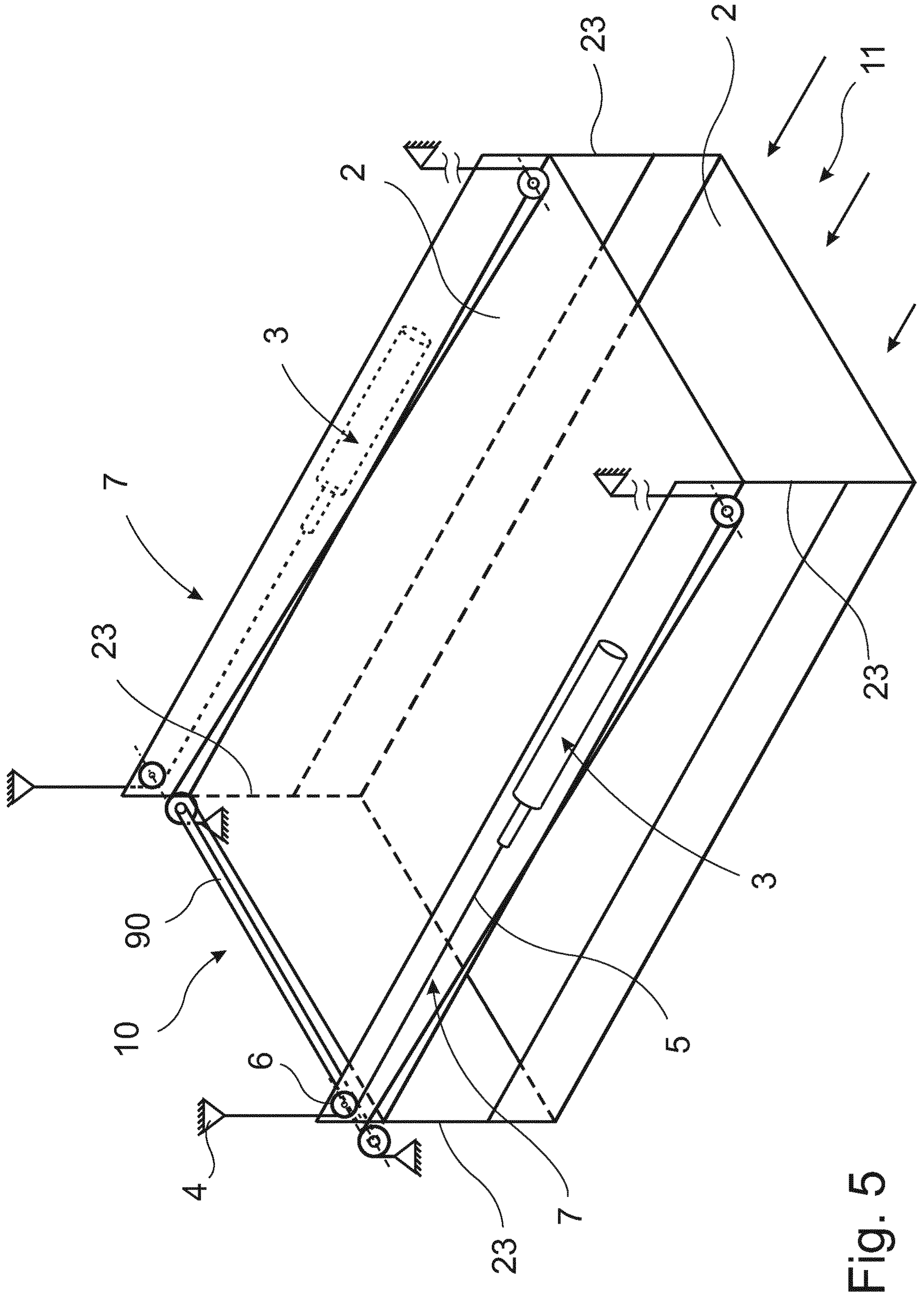
FIG. 5 is a schematic, perspective view of a fifth embodiment of an apparatus.

FIG. 5 is a schematic, perspective view of a fifth embodiment of an apparatus. In this embodiment, two platforms 2 which are arranged one above the other are provided. In this instance, the two platforms 2 are constructed in an identical manner. The two platforms 2 are connected parallel with each other with a constant spacing by means of four spacer elements 23. These spacer elements 23 may be configured in a rigid or flexible manner. It is also possible to arrange more than two platforms 2 in this manner one above the other. The platform 2 illustrated above corresponds to the platform 2 from the embodiment of FIG. 1 and has two movement devices 7. These movement devices 7 are configured in an identical manner to the embodiment illustrated in FIG. 1. It is, of course, also possible to provide two or more platforms 2 in the embodiment illustrated in FIG. 4 with a drive 3 which is arranged in a fixed manner. Generally, two or more platforms 2 may be provided for all the embodiments illustrated and described.

Figure 6:
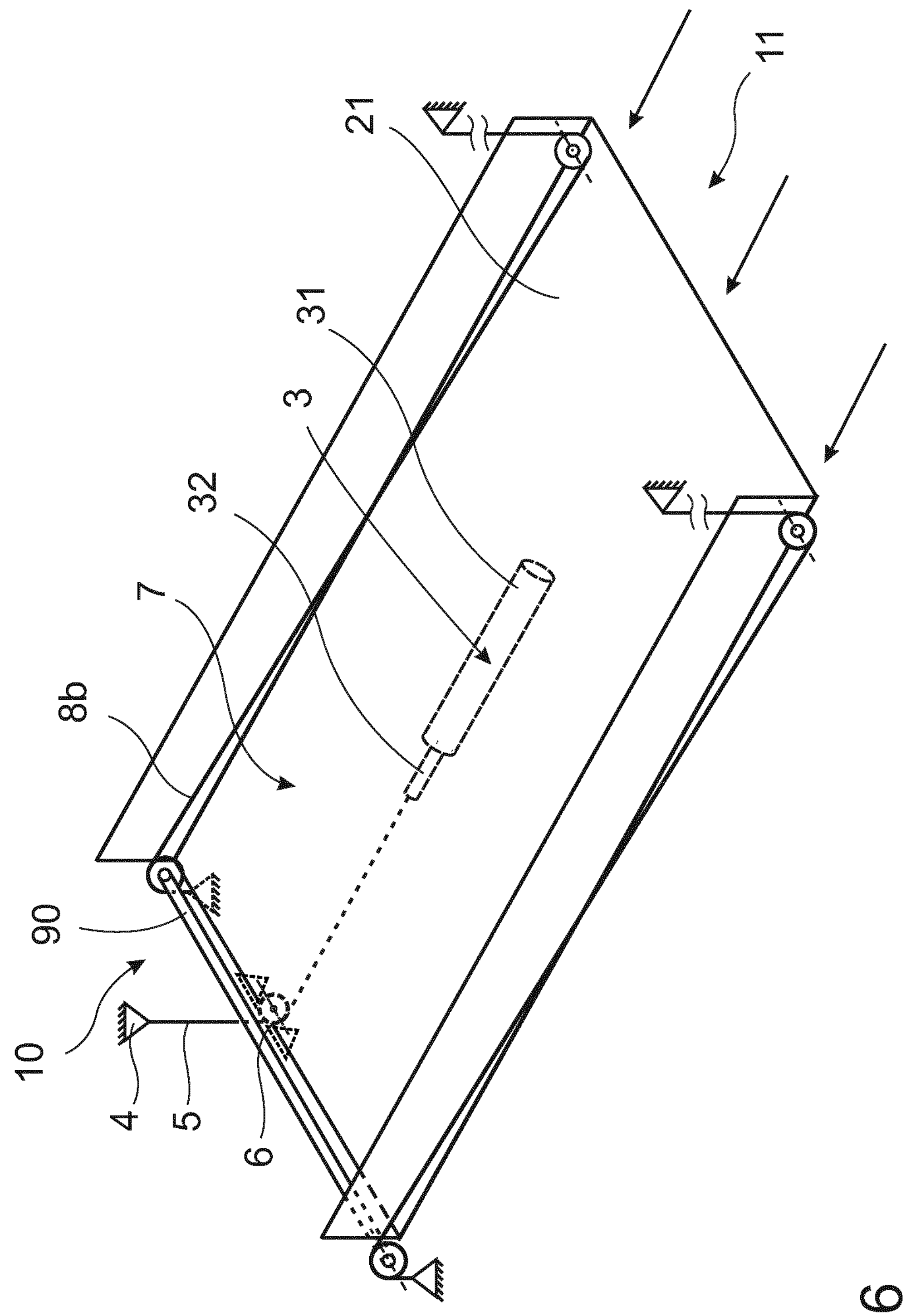
FIG. 6 is a schematic, perspective view of a sixth embodiment of an apparatus.

FIG. 6 is a schematic, perspective view of a sixth embodiment of an apparatus. In this embodiment, in contrast to the embodiments illustrated in FIGS. 1 to 5, only one movement device 7 with a drive 3 is provided. The drive 3 is in this instance fitted below the parking surface 21 and for this reason illustrated with dashed lines. This arrangement below the parking surface 21 is also particularly space-saving and at the same time, in a position of the platform 2 moved vertically upward, is very easily accessible for maintenance operations. The drive 3 consequently moves in this instance together with the platform 2. A redirection means 6 which is configured as a rotatable roller is also arranged below the platform 2. The anchor location 4 is in this instance arranged in a fixed manner above the first region 10 of the platform 2. The traction means 5 extends from the anchor location 4 initially in a vertically downward direction and is then redirected by the redirection means 6 in a horizontal direction to the drive 3. The traction means 5 is in this instance directly connected to the connection element 32 of the drive 3. The entire movement device 7 is in this instance arranged centrally in the transverse direction of the platform 2. The embodiment illustrated has the advantage that only one movement device 7 is provided and consequently fewer components are present than in the embodiments set out above. Of course, an apparatus may also have only one single movement device 7 in which the drive, as illustrated and described in FIG. 4, is arranged in a fixed manner above the platform and the anchor location 4 is connected to the platform 2. The embodiment illustrated in FIG. 4 also has a synchronization shaft 90 and two synchronization traction elements 8*a*, 8*b*. With regard to these components, reference may be made to the description relating to FIG. 1.

FIG. 7 is a schematic side view of a seventh embodiment of an apparatus. This side view shows an embodiment of an apparatus in which the platform 2 is configured so as to be able to be moved both in a vertical and in a horizontal direction. The platform 2 is illustrated in the lower position thereof, from which it can be moved vertically upward. The drive 2 is secured to the platform 2 with the base portion 31 thereof and moves together therewith. A redirection means 6 in the form of a rotatably supported roller is also arranged on the platform 2. The anchor location 4 is in this instance configured so as to be able to change position and secured to the ceiling of a building portion above the platform 2. In this instance, the anchor location 4 can be displaced in the horizontal position thereof. For this displacement, a displacement drive which is not illustrated is provided. As a result of this displacement drive, the anchor location 4 can be moved from the position thereof illustrated with continuous lines, for example, into the position 4' illustrated with dashed lines. The movement direction of the anchor location 4 is indicated with the double-headed arrow 43. The anchor location 4 also comprises a brake 41 in this embodiment. This brake 41 serves to clamp and consequently to fix the traction means 5 on the anchor location 4. In this embodiment, the traction means 5 extends from the connection element 32 of the drive 3 via the redirection means 6 in a vertically upward direction to the anchor location 4 where it is fixed by the brake 41 in the illustrated state. From the anchor location 4, the traction means 5 extends further to a traction means store 51. This traction means store 51 stores additional traction means 5. Such a traction means store 51 may, for example, be configured as a roller or a winch. In the illustrated state, in which the traction means 5 is fixed to the anchor location 4, the platform 2 moves in a vertical direction when the drive 3 is activated.

In order to move the platform 2 in a horizontal direction, starting from the state illustrated in FIG. 7 with continuous lines the following steps are carried out: firstly, the brake 41 is released so that the traction means 5 is no longer fixed at the anchor location 4. Subsequently, the anchor location 4 is displaced by the adjustment drive which is not illustrated in the horizontal position thereof, for example, as far as the position 4' illustrated with dashed lines. Subsequently, the brake 41 is fixed again so that the traction means 5 is clamped again at the anchor location 4. During the horizontal movement of the anchor location 4 in the direction of the position 4', the traction means 5 is removed from the traction means store 51. During the movement of the anchor location 4, there is still no movement of the platform 2. The adjustment drive is only provided to change the horizontal position of the anchor location 4. As soon as the anchor location 4 has reached the position 4', a horizontal movement of the platform 2 is also possible. To this end, a redirecting member 95 is first moved into position so that it engages in the traction means 5 which extends vertically downward from the position 4' of the anchor location 4. The redirecting member 95 may in this instance be configured differently and is suitable for assuming an active state, in which it engages in the traction means 5, and a passive state, in which it does not engage in the traction means 5. In the active state of the redirecting member 95, it fixes the vertical path of the traction means 5 between the position 4' of the anchor location 4 and the redirecting member 95. If the drive 3 is now activated, the platform 3 is moved in a horizontal direction initially toward the redirecting member 95. Such a horizontal movement of the platform 2 is, for example, useful in storage systems in which a particularly high packing density of objects is intended to be achieved. After the horizontal movement of the platform 2 to the left, the redirecting member 95 can now be moved into the passive state. With further activation of the drive 3, the platform 2, as described above, is now raised by the cooperation of the connection element 32, redirection means 6 and anchor location 4 into a position 4' in a vertical direction. For a horizontal movement of the platform 2 to the right, for example, there may be provided a resiliently active force store, such as a spring, which pulls the platform 2 back into the state thereof illustrated with continuous lines again. In the embodiment illustrated, the movement drive 7 is used both for a vertical movement and for a horizontal movement of the platform 2. Whether a horizontal or a vertical movement takes place is determined in this instance by the position of the anchor location 4. This anchor location 4 may be positioned in the horizontal position thereof by means of an adjustment drive. In this embodiment, only a single powerful drive 3 is required to move the platform 2. In order to adjust the horizontal position of the platform 2, only an adjustment drive which is constructed in a simple manner is required. Of course, the principle of a horizontally movable anchor location 4 can also be combined with other embodiments in order to achieve a horizontal movability of the platform 2.

FIG. 8 is a schematic side view of an eighth embodiment of an apparatus. In this eighth embodiment, both a vertical movement and a horizontal movement of the platform 2 are also possible. The technical principle for moving the platform 2 in a vertical direction is identical to the embodiment illustrated in FIG. 1: there is provided a drive 3 which is arranged on the platform 2 and which has a horizontally movable connection element 32. From this connection element 32, a traction means 5 extends over a redirection means 6 which is also arranged on the platform 2 to an anchor location 4 which is arranged in a fixed manner. In order to move the platform 2 in a horizontal direction, a horizontal gear mechanism 96 is provided. This horizontal gear mechanism 96 can optionally be connected to the drive 3. For a vertical movement of the platform 2, the drive 3 is connected to the traction means 5 as described above. If a horizontal movement of the platform 2 is intended to take place, the connection between the drive 3 and the traction means is temporarily separated. Instead, the drive 3 is connected to the horizontal gear mechanism 96. If the drive 3 is now activated, the horizontal gear mechanism 96 produces a movement of the platform 2 in a horizontal direction. In the embodiment illustrated, a towing means 98 is provided and extends from the horizontal gear mechanism 96 to a towing location 97. When the drive 3 is activated, the horizontal gear mechanism 96 produces a movement of the towing means 98. The towing means 98 is in this instance drawn into the horizontal gear mechanism 96. As a result, the platform 2 is pulled along the towing means 98 to the towing location 97 arranged on the left and is consequently moved in a horizontal direction.

A movement in the opposing direction can be produced by means of a resilient force store, such as, for example, a spring. Such a resilient force store is not illustrated in this instance. Alternatively, the towing means 98 may also be configured in such a manner that a force transmission is possible in two directions. To this end, the towing means 98 may be configured in a rigid manner, for example, as a toothed rack. In this embodiment, the horizontal gear mechanism 96 is configured in such a manner that it moves along the towing means 98 which is configured in a rigid manner when the drive 3 is activated. In this instance, in the horizontal gear mechanism 96 a linear movement of the drive 3 can be converted into a rotational movement of a pinion which in turn engages in a towing means 98 which is configured as a toothed rack. If, as a result of the cooperation of the drive 3, horizontal gear mechanism 96 and towing means 98, the desired horizontal position of the platform 2 is reached, the horizontal gear mechanism 96 can be separated from the drive again and it can be connected to the traction means 5 again in order to produce a vertical movement of the platform 2. The embodiment illustrated in FIG. 8 also enables both a vertical movement and a horizontal movement of the platform 2 using only one drive 3. The embodiment illustrated in FIG. 8 can, of course, also be combined with an anchor location 4 which is configured to be able to be moved horizontally, as in the embodiment illustrated in FIG. 7.

The claims which have now been submitted with the application and those submitted subsequently are without prejudice for obtaining continued protection.

If, on closer examination, in particular also of the relevant prior art, it should be found that one or other feature may be advantageous for the objective of the invention but is not decisively significant, a wording which no longer has such a feature, in particular in the main claim, is naturally already sought. Such a sub-combination is also covered by the disclosure of this application.

It should further be noted that the embodiments and variants of the invention described in the various embodiments and shown in the Figures can be freely combined with each other. In this instance, individual or multiple features are mutually interchangeable. These feature combinations are also disclosed.

The references set out in the dependent claims refer to the further formation of the subject-matter of the main claim by the features of the respective dependent claim. However, they are not intended to be understood to be an omission in respect of obtaining independent objective projection for the features of the dependent claims referred to.

Features which have been disclosed only in the description or also individual features from claims which comprise a plurality of features may be taken at any time to have inventively significant meaning for distinguishing from the prior art in the independent claim/claims and even if such features were mentioned in connection with other features or achieve particularly good results in connection with other features.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms “for example,” “for instance,” “such as,” and “like,” and the verbs “comprising,” “having,” “including,” and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. An apparatus for parking vehicles, comprising:

at least one platform which can be moved by a movement device and which has a parking surface, at least one movement drive which is part of the movement device, and at least one traction means being a chain or a cable which is part of the movement device, wherein the traction means connects an anchor location to the movement drive, wherein the movement drive is configured as a linear drive which comprises a fixed base portion and a connection element which can be moved in a linear manner relative thereto, wherein a movement direction of the connection element is substantially horizontal, wherein there is provided laterally on the platform a respective synchronization traction element which extends with a first portion in a first region of the platform over a central second portion, which extends on the platform to a third portion to a second region of the platform opposite the first region and which is fixed with one end thereof in the first region and with the other end thereof in the second region, and wherein each synchronization traction element is guided at least by a roller on the platform.

2. The apparatus as claimed in claim 1, wherein the movement device moves the platform in a horizontal direction, a vertical direction, or both a horizontal direction and a vertical direction.

3. The apparatus as claimed in claim 1, wherein a horizontal position of the anchor location is configured so as to be able to be changed relative to the movement device or is arranged in a fixed manner.

4. The apparatus as claimed in claim 1, wherein the movement drive can be optionally connected to a horizontal gear mechanism, wherein the horizontal gear mechanism converts a movement produced by the movement drive into a horizontal movement of the platform.

5. The apparatus as claimed claim 1, wherein the apparatus comprises at least one redirection location for redirecting the traction means, wherein the traction means connects the anchor location to the movement drive via the redirection location which changes the direction of the traction means.

6. The apparatus as claimed in claim 5, wherein the redirection location includes a roller which is rotatably supported with respect to the platform and is arranged on the platform.

7. The apparatus as claimed in claim 5, wherein the redirection location includes a roller which is rotatably supported relative to a fixed base, and is arranged on the fixed base.

8. The apparatus as claimed in claim 5, wherein the redirection location includes a fixed sliding piece which is arranged on the platform or a fixed base.

9. The apparatus as claimed in claim 5, wherein the movement direction of the connection element is directed in a direction toward the redirection location when moved out of the fixed base portion.

10. The apparatus as claimed in claim 5, wherein the movement direction of the connection element is directed in a direction away from the redirection location when moved out of the fixed base portion.

11. The apparatus as claimed in claim 5, wherein the traction means extends substantially vertically between the redirection location and the anchor location.

12. The apparatus as claimed in claim 5, wherein the traction means extends substantially horizontally between the redirection location and the movement drive.

13. The apparatus as claimed in claim 1, wherein the movement drive is connected to the platform at the fixed base portion thereof and the movement drive moves together with the platform in a vertical direction.

14. The apparatus as claimed in claim 1, wherein the movement device has at least one vertically extending guide which has a fixed portion which is secured to a fixed base, and the vertically extending guide further has a movable portion which is connected to the platform and the movable portion is guided so as to be able to be moved vertically in the fixed portion.

15. The apparatus as claimed in claim 1, wherein at least one side portion is provided on the platform adjacent to the parking surface and the movement drive is secured to the side portion.

16. The apparatus as claimed in claim 1, wherein the movement drive is secured below the platform and below the parking surface.

17. The apparatus as claimed in claim 1, wherein the movement drive is configured as a hydraulic cylinder, as a pneumatic cylinder, as an electromechanical linear drive or as an electric linear motor.

18. The apparatus as claimed in claim 1, wherein a plurality of movement devices, a plurality of movement drives, or both a plurality of movement devices and a plurality of movement drives are provided.

19. The apparatus as claimed in claim 1, wherein the anchor location is arranged in a fixed manner above the platform and is identical to or connected to a location on a building or a fixed frame.

20. The apparatus as claimed in claim 1, wherein the anchor location is arranged on the platform and so as to be non-movable relative to the platform.

21. The apparatus as claimed in claim 1, wherein the movement drive is secured to a fixed base.

22. The apparatus as claimed in claim 1, wherein the traction means is directly connected to the connection element of the movement drive and the connection element transmits its movement to the traction means.

23. The apparatus as claimed in claim 1, wherein the traction means is connected at an end thereof opposite the anchor location to a traction location which is located in a constant position with respect to the fixed base portion and the traction means extends from the traction location to the connection element.

24. The apparatus as claimed in claim 1, wherein there is provided on the connection element a redirection roller via which the traction means is guided.

25. The apparatus as claimed in claim 1, wherein the apparatus comprises at least two platforms which can be raised and lowered and which are arranged vertically one above the other, wherein the two platforms are connected with a constant spacing with respect to each other by spacer elements.

26. The apparatus as claimed in claim 1, wherein the two ends of the synchronization traction elements are secured to a fixed base.

27. The apparatus as claimed in claim 1, wherein the rollers of both synchronization traction elements are connected in a rotational manner by a synchronization shaft.

28. An apparatus for parking vehicles, comprising:

at least one platform which can be moved by a movement device and which has a parking surface, two movement drives which are part of the movement device, and two chains which are part of the movement device, wherein the chains each connect a respective anchor location to one of the two movement drives, wherein the movement drives are each configured as a linear drive which comprises a fixed base portion and a connection element which can be moved in a linear manner relative thereto, wherein a movement direction of each connection element is substantially horizontal, wherein the movement drives are each connected to the platform at the fixed base portion thereof and the movement drives each move together with the platform in a vertical direction, wherein two side portions are provided on the platform adjacent to the parking surface and the movement drives are each secured to one of the two side portions, wherein the anchor locations are each arranged in a fixed manner above the platform and are identical to or connected to a location on a building or a fixed frame, wherein the apparatus comprises two redirection locations for redirecting the chains, wherein the chains each connect one of the anchor locations to one of the movement drives via one of the redirection locations which each change the direction of the respective chain, and wherein the chains each extend substantially vertically between the respective redirection location and anchor location.

29. The apparatus as claimed in claim 28, wherein there is provided laterally on the platform a respective synchronization traction element which extends with a first portion in a first region of the platform over a central second portion which extends on the platform to a third portion to a second region of the platform opposite the first region and which is fixed with one end thereof in the first region and with the other end thereof in the second region, wherein each synchronization traction element is guided at least by a roller on the platform.

30. The apparatus as claimed in claim 29, wherein the two ends of the synchronization traction elements are secured to a fixed base.

31. The apparatus as claimed in claim 29, wherein the rollers of both synchronization traction elements are connected in a rotational manner by a synchronization shaft.

32. The apparatus as claimed in claim 31, wherein the synchronization shaft, when viewed from a side of the apparatus, is arranged vertically in a line with the redirection locations.

33. The apparatus as claimed in claim 28, wherein the movement device moves each platform in a horizontal direction, a vertical direction, or both a horizontal direction and a vertical direction.

34. The apparatus as claimed in claim 28, wherein a horizontal position of each anchor location is configured so as to be able to be changed relative to the movement device or is arranged in a fixed manner.

35. The apparatus as claimed in claim 28, wherein the movement drives are each configured as a hydraulic cylinder, as a pneumatic cylinder, as an electromechanical linear drive or as an electric linear motor.

36. The apparatus as claimed in claim 28, wherein the redirection locations each include a roller which is rotatably supported with respect to the platform and is arranged on the platform.

37. The apparatus as claimed in claim 28, wherein the redirection locations each include a fixed sliding piece which is arranged on the platform or a fixed base.

38. The apparatus as claimed in claim 28, wherein the movement directions of the connection elements are each directed in a direction toward the respective redirection location when moved out of the respective fixed base portion.

39. The apparatus as claimed in claim 28, wherein the movement directions of the connection elements are each directed in a direction away from the respective redirection location when moved out of the respective fixed base portion.

40. The apparatus as claimed in claim 28, wherein the chains each extend substantially horizontally between the respective redirection location and movement drive.

41. The apparatus as claimed in claim 28, wherein the chains are each directly connected to the connection element of the respective movement drive and the connection element transmits its movement to the chains.

42. The apparatus as claimed in claim 28, wherein the chains are each connected at an end thereof opposite the respective anchor location to a traction location which is located in a constant position with respect to the fixed base portion and the chains each extend from the respective traction location to the respective connection element.

43. The apparatus as claimed in claim 28, wherein there is provided on each connection element a redirection roller via which the chains are each guided.

44. The apparatus as claimed in claim 28, wherein the apparatus comprises at least two platforms which can be raised and lowered and which are arranged vertically one above the other, wherein the two platforms are connected with a constant spacing with respect to each other by spacer elements.

* * * * *